Dec. 15, 1942. E. E. TOEWS 2,305,044
CONVEYER AND ELEVATOR BELT
Filed April 28, 1939
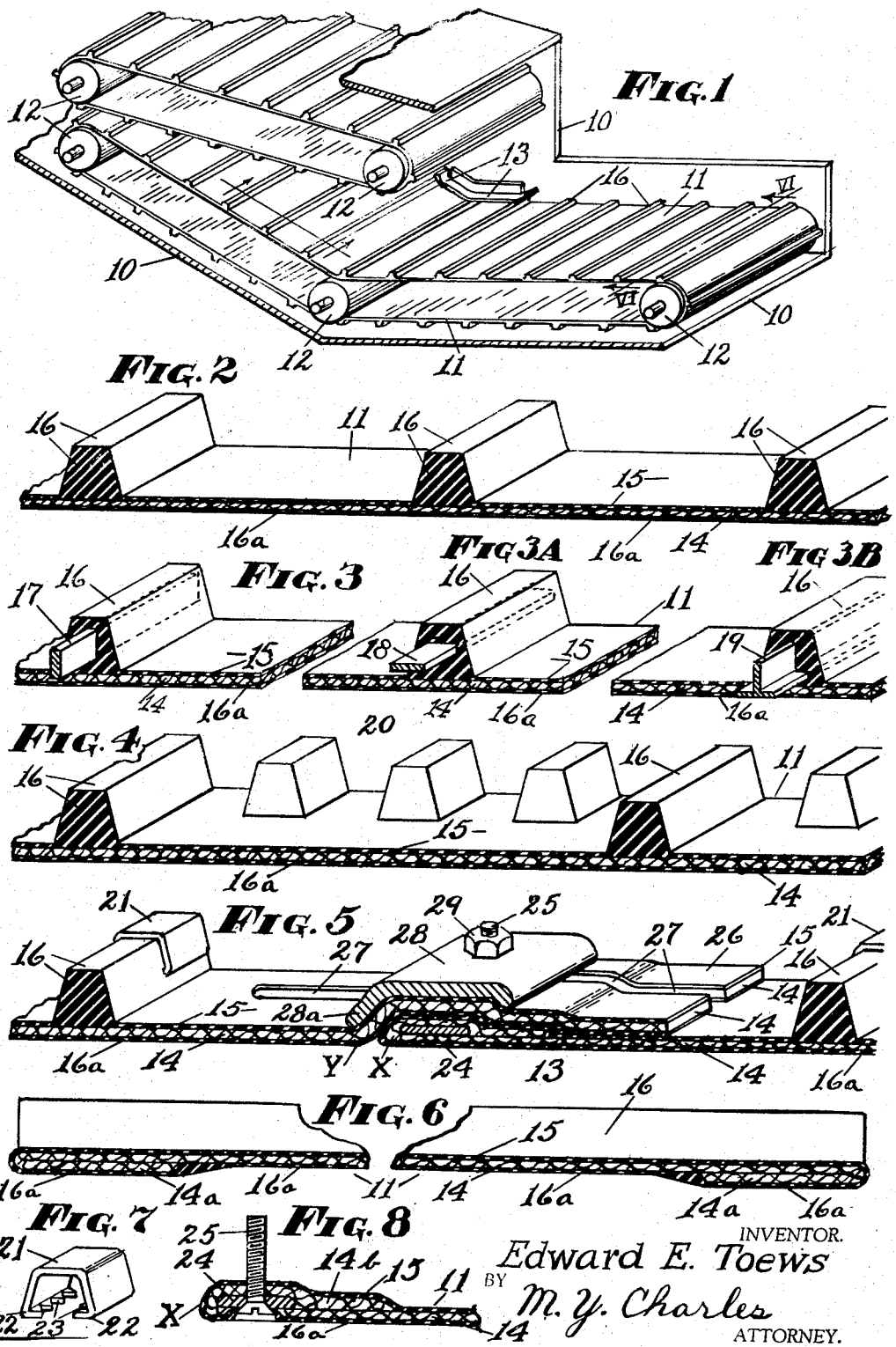
INVENTOR.
Edward E. Toews
BY M. Y. Charles
ATTORNEY.

Patented Dec. 15, 1942

2,305,044

UNITED STATES PATENT OFFICE 2,305,044

CONVEYER AND ELEVATOR BELT

Edward E. Toews, Halstead, Kans., assignor to Rub-R-Slat Co., Halstead, Kans.

Application April 28, 1939, Serial No. 270,611

1 Claim. (Cl. 198—198)

My invention relates to an improvement in the construction of conveyer and elevator belts, and more particularly to those used on farm machinery, such as harvesters, binders, headers and the like.

The object of my invention is to provide a conveyer or elevator belt that will give longer service and eliminate much of the need for repairing by having the bars or ribs thereon vulcanized to the belt.

A serious defect has heretofore existed in the slats or ribs on conveyer or elevator aprons or canvases for harvesters and other purposes becoming loose on the belt or broken. The most common slats used are wood or metal with a fiber filler, the slats usually being tacked or riveted to the apron or belting.

This defect is entirely overcome in my invention because the belting is rubberized, or covered by a rubber cover on which the slats or ribs are integrally formed and vulcanized to the textile belting base.

Now referring to the accompanying drawing,

Fig. 1 is a perspective view illustrating an application or use of my improved conveyer belting.

Fig. 2 is an enlarged detail perspective view, and partly in longitudinal section illustrating the simple form of my invention.

Fig. 3 is an enlarged detail perspective view, partly in longitudinal section, showing a flat rod set vertically in the rib as a reinforcement therefor.

Fig. 3A is the same as Fig. 3, except that the reinforcing rod is set horizontal in the rib.

Fig. 3B is the same as Fig. 3, except that the reinforcing rod is shown to be in the form of an inverted T-shaped rod.

Fig. 4 is an enlarged detail perspective view, partly in longitudinal section, and illustrating the application of slide knobs along the edge of the belt intermediate the slats or ribs.

Fig. 5 is an enlarged detail perspective view, partly in longitudinal section, illustrating a device for joining the ends of the belt together, and also showing the application of a slide clip on the rubber slats or ribs.

Fig. 6 is an enlarged transverse sectional view of the belt, the view being taken along the line VI—VI in Fig. 1.

Fig. 7 is a detail perspective view of the slide clip employed or shown on the slats or ribs in Fig. 5.

Fig. 8 is a detail sectional view through the underlying end of the belt union shown in Fig. 5, and illustrating the construction at the point where the clamp bolt passes through the underlying end of the belt.

Similar numerals of reference designate the same part throughout the several figures of the drawing.

In the drawing in Fig. 1 is seen what may be a feed house, or other similar structure 10 for a harvesting machine or the like, wherein slatted conveyer belts 11 run over rollers 12, or under guide shoes 13. This view is merely shown to illustrate the use of the belt and is not to be taken as limiting the use of the belt to harvesters and the like. The belt may be used in any place where there is a conveying job to be done wherein a slatted or ribbed conveyer belt is practical to be used.

The belt comprises preferably a cross woven textile or fabric belt 14 as a base or core for rubberization or rubber impregnation 15 and 16a for the purpose of protecting the belt and receiving rubber slats to be vulcanized thereto. The covering 15 comprises a coating of rubber compound or gum covering on one side of the fabric 14. On the rubber coating 15 is a series of spaced apart rubber ribs 16 that may be of any desired shape or size and may be located in any desired position.

After the belt 14 has been covered or rubberized as above described the slats 16 are built up, on the belt, of rubber compound, gum, or similar material which will readily bind itself to intimate union with the rubberization on the fabric body 14. This having ben done, the bottom side and edges of the fabric 14 are provided with a rubberization or covering 16a prepared and applied in the same manner as described for the top covering 15, after which the entire assembly is placed under pressure, in a mould, and subjected to heat whereupon the several parts vulcanize to their adjacent part and the belt becomes one composite integral mass in the form of a belt having ribs 16 thereon.

If the belt is a wide belt and the loads that the belt is subjected to are such that the belt would sag between the points of its support at the sides thereof; or if the loads were such that they are concentrated at some certain point and would tend to pull the rib 16 loose at that point, the rib 16 may be reinforced with a reinforcing element which, for illustration may be a flat bar 17 set vertically in the rib 16, or it may be a flat bar 18 set horizontally in the rib 16, or it may be a T-iron, or any other shaped reinforcement element 19 set in the rib 16. Any reinforcement placed in the ribs 16 would be of such material, size and shape, and would be so located or positioned as to overcome any weakness or undesirable flexing of the ribs or sagging of the belt as above mentioned.

There are frequent instances where conveyer belts of this type are used that the belt is required to run in a line of travel counter to that of passing around a roller, and in such instances the edges of the belt are run under a curved guide shoe such as illustrated at 13 in Fig. 1. If the ribs 16 are spaced close enough together that two or more of the ribs 16 are under the straight portion of the shoe 13 at the same time the belt will run quite smoothly, however if the ribs 16 were spaced further apart there would be a flopping motion imparted to the belt as the ribs 16 were forced under the shoe 13 at one end thereof and another one of the ribs 16 left the shoe 13 at the other end thereof.

In order to avoid this flopping motion of the belt when the ribs 16 are spaced far apart, I have provided a series of knob-like elements 20 that are the same height as the ribs 16 and are equally spaced between the ribs 16 and along the edges of the belt. The knobs 20 are fixed on the rubber covering 15 the same as the ribs 16 are, or if desired, the knobs may be attached to the belt by means of rivets and the like.

If a belt is one that is to receive extra heavy or hard use, the edges of the belt will probably show their wear, or will give way first; therefore, as shown in Fig. 6, the edges of the fabric 14 may be folded upon themselves as shown at 14a and in the process of vulcanization, above described, the folded portion 14a will be vulcanized to the main body portion 14 thereby providing an extra heavy and strong edge on the belt that will materially increase the durability and life of the belt.

There will also be instances where the belt will not slide easily under the shoe 13 and which condition will cause heavy wear on the ends of the ribs 16 or on the knobs 20. In order to overcome this undesirable feature I have provided a U-shaped clip 21, the ends 22 of the U being turned inwardly toward each other and provided with sharp teeth 23 so that the clip 21 may be placed over the ends of the ribs 16, or over the knobs 20 and the U squeezed together so as to make the teeth 23 sink into the side walls of the ribs 16 or knobs 20 as a means of holding the clip 21 in place on the ribs 16 or knobs 20. The use of the clips 21 will relieve much of the friction of the slats and knobs on the shoe 13 and will materially increase the life of the belt device.

While the foregoing description of the belt is a desirable form of belt, it is to be understood that the belt may be made in long lengths and carried in rolls as stock belting having no special provision made in the belting for belt end splicing or joining. In this case the ends of the belt would be joined together by any of the conventional forms of lacing or the employment of standard belt clamps and the like.

Although I have shown and described the preferred form of my improved belt device it is to be understood that such modifications of my invention may be employed as lie within the scope of the appended claim without departing from the spirit and intention of the invention. Now having fully described my invention, I claim:

In a belt of the character described, in combination, a fabric having double thick edge portions all of which comprise a base element for the belt, said base element having a rubberized coating on which is formed rubber ribs that substantially span the width of the belt, and rib like portions spaced apart along the edges of the belt, said rib like portions and the end portions of said ribs being positioned over the double thick portion of the edges of the base element, and the foregoing elements and assembly thereof being vulcanized into a composite piece of belting as shown and described.

EDWARD E. TOEWS.